United States Patent [19]

Nelson

[11] 4,287,922

[45] Sep. 8, 1981

[54] FOLDABLE BUCKSAW

[75] Inventor: John R. Nelson, Lemont, Ill.

[73] Assignee: Research, Development & Marketing, Barrington, Ill.

[21] Appl. No.: 116,020

[22] Filed: Jan. 28, 1980

[51] Int. Cl.³ .............................................. B27B 21/00
[52] U.S. Cl. .................................................. 145/32 R
[58] Field of Search ....................................... 145/32 R

[56] References Cited

U.S. PATENT DOCUMENTS 458,827  9/1891  Durand ............................. 145/32 R

FOREIGN PATENT DOCUMENTS

| 109324 | 12/1939 | Australia ............................ 145/32 R |
| 18781 | 5/1914 | Denmark ............................ 145/32 R |
| 31617 | 6/1885 | Fed. Rep. of Germany .... 145/32 R |
| 545022 | 2/1932 | Fed. Rep. of Germany .... 145/32 R |
| 499630 | 11/1919 | France .............................. 145/32 R |
| 765462 | 3/1934 | France .............................. 145/32 R |
| 902892 | 1/1945 | France .............................. 145/32 R |
| 1029681 | 11/1953 | France .............................. 145/32 R |
| 254021 | 4/1948 | Switzerland ...................... 145/32 R |
| 307720 | 6/1955 | Switzerland ...................... 145/32 R |

Primary Examiner—Stephen G. Kunin
Assistant Examiner—J. T. Zatarga
Attorney, Agent, or Firm—Burmeister, York, Palmatier, Hamby & Jones

[57] ABSTRACT

A portable bucksaw employing a hollow tube as a cross support and a pair of bars pivotally attached on opposite sides of each end of the blade of the saw, the bars in one position extending through slots in the tube to a tensioning apparatus on the opposite side of the tube from the blade, and in another position folding to a position parallel to the blade, the blade and bars being insertable into the tube when in said other position for storage.

6 Claims, 20 Drawing Figures

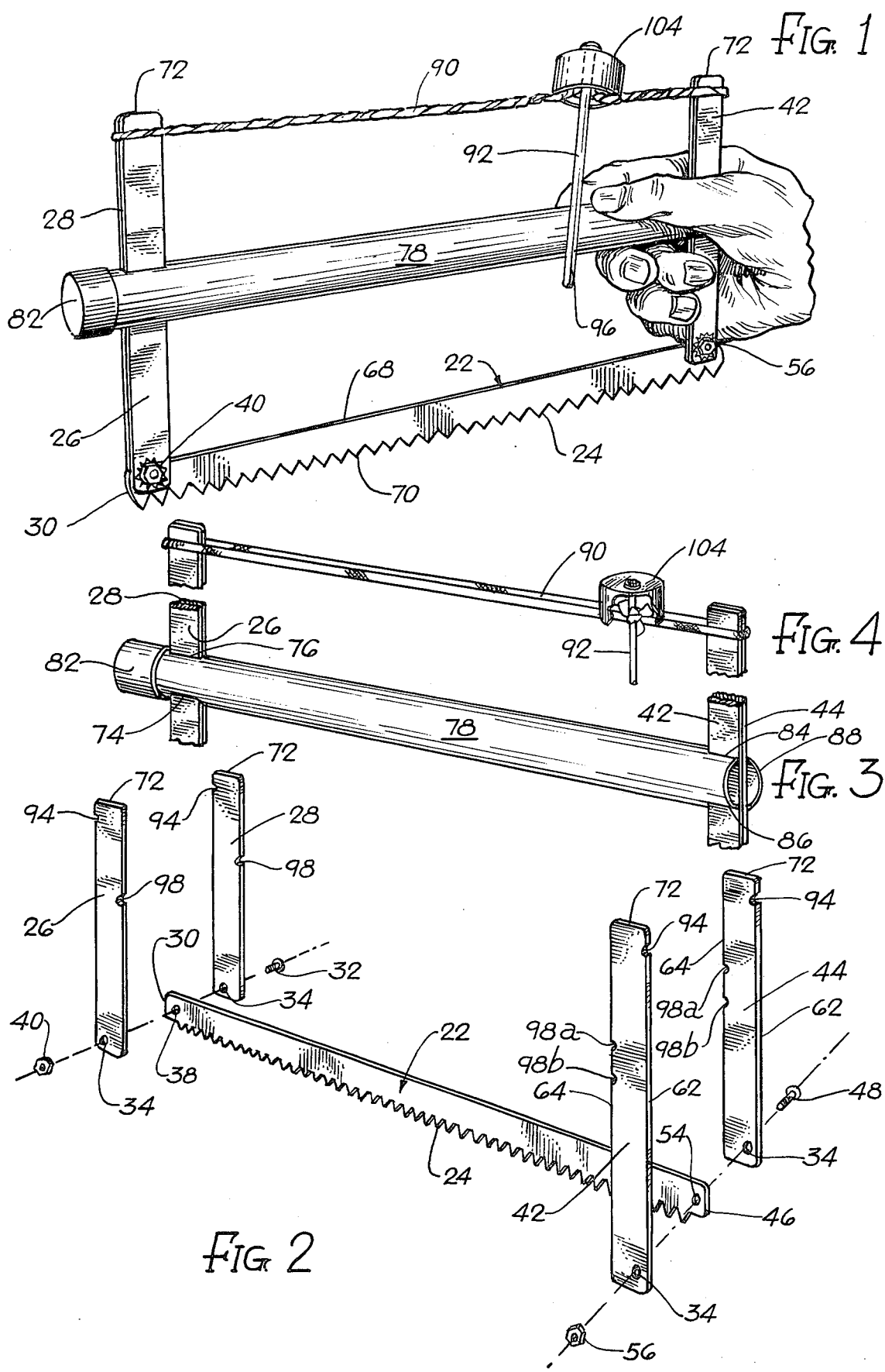

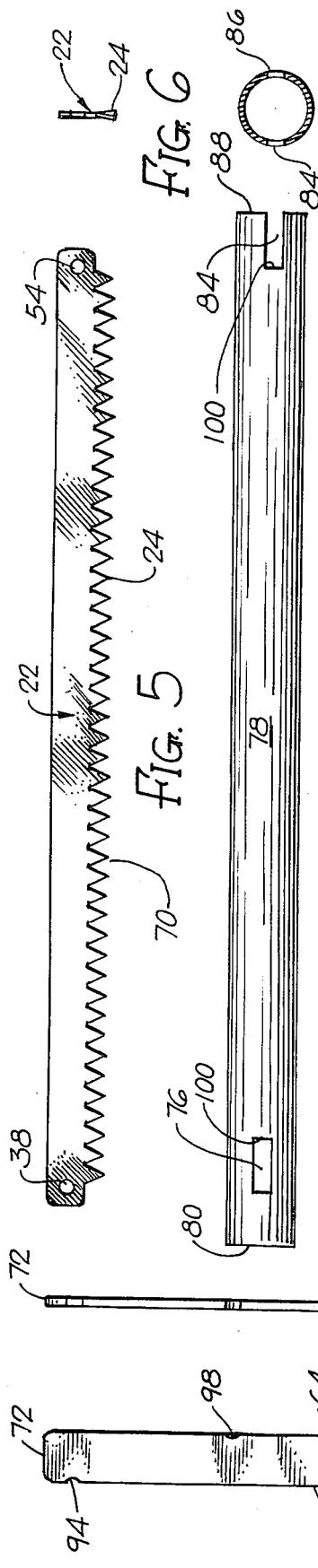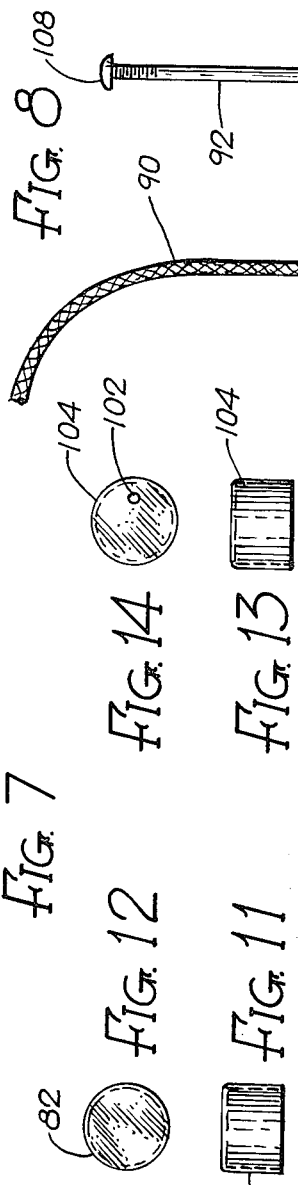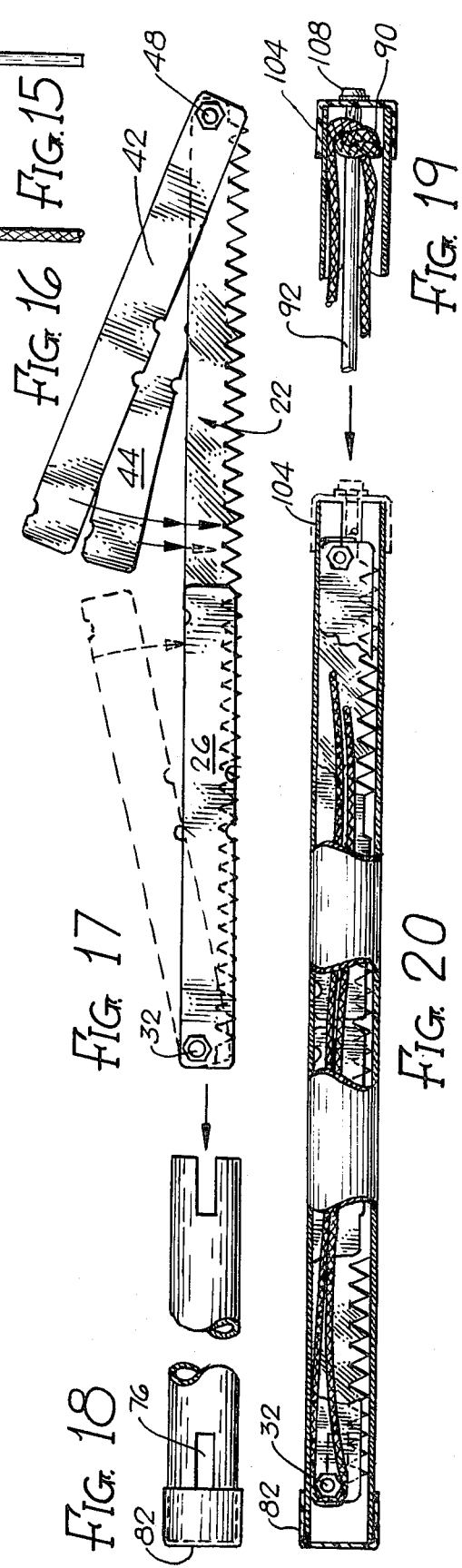

FOLDABLE BUCKSAW

The present invention relates generally to foldable saws, and more particularly to foldable saws suitable for camping use.

It has long been known to the art to provide a saw which may be folded or disassembled in order to transport or store the saw between successive uses. Such saws are generally lightweight devices, often unsuitable for camping use which may require the cutting of heavy logs or branches or the like.

Foldable saws known to the prior art either use a carrying case or are generally not sufficiently well stored of themselves to be packable in a camping pack. Sharp edges, or protruding teeth, cannot be tolerated in a camp pack. On the other hand, foldable saws which employ separate carrying cases impose the burden on the camper of additional weight and equipment. U.S. Pat. No. 2,734,536 to G. G. Harper and U.S. Pat. No. 2,667,195 to E. R. Kilmer are examples of foldable bucksaws which require separate carrying cases. Foldable bucksaws have long been known to the art, as shown by W. Morehouse U.S. Pat. No. 46,013, but such bucksaws do not achieve the objects of the present invention.

Lightweight saws which may be placed in a tubular portion of the frame of the saw have been taught by Bradley U.S. Pat. No. 3,905,409 and R. E. Swenson U.S. Pat. No. 3,149,652. Such saws however require complicated assembly employing wing nuts which may be lost in the field, and are of light weight.

In accordance with the present invention a bucksaw is provided with a tubular crossbar which supports bars pivotally attached at opposite ends of the blade of the saw during use, and the blade and support bars, as well as the tensioning mechanism for the saw are all stored within the tubular support bar during periods of non-use or travel. The bucksaw provided by the present invention is rugged, capable of heavy work, free of detachable parts which may be readily lost, as well as lightweight and free of sharp edges to facilitate its use as a camping tool.

Those skilled in the art will recognize the advantages and objects of the present invention more fully from the following disclosure, but particularly with reference to the accompanying drawings, in which:

FIG. 1 is an elevational view of a saw constructed according to the teachings of the present invention;

FIG. 2 is an exploded view of the blade assembly;

FIG. 3 is a fragmentary elevational view of a portion of the saw including the supporting tube;

FIG. 4 is a fragmentary elevational view of a portion of the saw including the tensioning means;

FIG. 5 is an elevational view of the blade;

FIG. 6 is an end view of the blade;

FIG. 7 is a plan view of the tube;

FIG. 8 is an end view of the tube;

FIG. 9 is a side elevational view of one of the support bars;

FIG. 10 is an edge view of the support bar of FIG. 9;

FIG. 11 is a side elevational view of one of the caps;

FIG. 12 is a plan view of the cap of FIG. 11;

FIG. 13 is a side elevational view of the other cap;

FIG. 14 is a plan view of the cap of FIG. 13;

FIG. 15 is an elevational view of the pin;

FIG. 16 is an elevational view of the cord;

FIGS. 17 and 18 illustrate the process of storing the saw, FIG. 17 being a side elevational view of the saw blade and bar assembly, one of the bars being shown in a prior position in dashed lines, and FIG. 18 being a broken elevational view of the tube with one end cap thereon and the other removed illustrating the manner in which the saw blade and bar assembly of FIG. 17 is insertable therein; and FIGS. 19 and 20 illustrate the stored position of the saw, FIG. 19 being with the other end cap showing the manner in which the cord is stored therein, and FIG. 20 being a sectional view, partly in elevation showing the tube with attached end caps and all other elements of the saw contained therein.

FIG. 1 illustrates a saw constructed according to the present invention in assembled form being operated by the hand of a user. The saw is of the bucksaw type and has an elongated saw blade 22 with outwardly extending teeth 24. A first pair of bars 26 and 28 are pivotally attached to one end 30 of the blade 22 by means of a pin in the form of a bolt 32 which extends through apertures 34 adjacent to one end 66 of the bars 26 and 28 and an aperture 38 adjacent to the end 30 of the saw blade 22. The bolt 32 is secured in position in a conventional manner by means of a lock nut 40.

In like manner, a second pair of bars 42 and 44 are pivotally mounted on the other end 46 of the blade 22 by means of a second bolt 48 which extends through apertures 34 in the bars 42 and 44 respectively and an aperture 54 extending through the blade 22 adjacent to the end 46. A lock nut 56 secures the bolt 48 in position and completes the assembly of the saw blade 22 and first and second pairs of bars.

The bars of the first pair and the bars of the second pair are identical, with one exception to be described hereinafter and the bars 26 and 28 of the first pair are best illustrated in FIGS. 9 and 10. The bars have flat sides 58 and 60, and straight edges 62 and 64 which are disposed parallel to the axis of elongation or central axis of the bar. The aperture, designated 34, is displaced from the center line toward the edge 62 adjacent to one end 66 of the bar so that the edges 62 and 64 of the bar will tend to align with the edges 68 and 70 of the blade in the folded position illustrated in FIG. 20. The end of the bar is normal to the sides 62 and 64, and parallel to the opposite end 72 thereof.

The first pair of bars 26 and 28 are pivotal on the bolt 32, and may be pivoted to a position generally normal to the axis of the blade 22. In this position, the first pair of bars are parallel to each other and closely adjacent, and the bars will slidably engage a pair of apertures or closed slots 74 and 76 disposed in a tube 78. The tube 78 is an elongated hollow cylinder, and the slots 74 and 76 are disposed on opposite sides of the axis of elongation of the cylinder 78. Each of the slots is rectangular in shape and slidably but snugly accommodates the first pair of bars 26 and 28. The slots 74 and 76 are located adjacent to one end 80 of the tube 78, and an end cap 82 is disposed over that end.

The tube 78 is provided with a second pair of open ended slots 84 and 86 at the other end 88 of the tube. These slots 84 and 86 extend into the tube 78 parallel to the axis of elongation thereof, and on an axis which is parallel to the axis between the slots 74 and 76. The second pair of bars 42 and 44 are pivotal on the bolt 48 to assume a position substantially normal to the axis of the blade 22 and adjacent to each other, and the second pair of bars 42 and 44 may be inserted into the second pair of slots 84 and 86. The slots 84 and 86 are open at the end 88, but otherwise rectangular, to slidably accommodate the bars 42 and 44. The first and second pairs of bars engage the tube 78 approximately centrally so that the ends 72 of the bars are spaced from the tube.

A tensioning member in the form of a closed loop or tied loop of twine 90 is positioned between the first and second pairs of bars adjacent to the ends 72 thereof. The twine loop 90 carries an elongated pin 92 which is utilized to twist the twine loop, thereby shortening it, and pulling the ends 72 of the first pair of bars toward the ends 72 of the second pair of bars. A recess 94 is disposed in the edge 62 of each of the bars to both pairs to engage the twine loop and assure that it will not slip from position. Further, tightening of the twine loop will cause the second pair of bars 42 and 44 to pivot slightly within the slots 84 and 86, a permissible motion due to the fact that the slots 84 and 86 extend to the end 88 of the tube 78. As a result, tightening of the twine loop 90 causes the saw assembly to become rigid. After the twine loop 90 is tightened, the end 96 of the pin 92 extends beyond the tube 78 and abuts the tube to maintain the twisted and shortened position of the twine loop.

Each of the bars of the first pair 26 and 28 is provided with a small recess 98 located in the edge 64 and generally centrally between the ends 66 and 72 thereof, and hence on the opposite side of the bar from the recess 94. Each of the bars 42 and 44 of the second pair is provided with a pair of recesses 98a and 98b in the side 64 thereof, and are otherwise identical to the bars 26 and 28 of the first pair. The recesses 98 of the first pair of bars 26 and 28 therefore confront the recesses 98a of the second pair of bars 42 and 44. The recesses 98a and 98b are spaced from each other by the diameter of the tube 78, and hence the recesses 98 engage the flat ends 100 of the slots 74, 76 and 84, 86 of the tube 78. This construction assures the proper position of the bars of the first and second pair with respect to the tube 78 and facilitates assembly in that the recesses 98, 98a and 98b tend to hold the bars of the first and second pair in position while the loop of twine 90 is being twisted and tightened. The closed slots 74 and 76 engage the bars 26 and 28 sufficiently snugly to prevent any significant pivoting of the bars 26 and 28 with respect to the tube 78, thereby providing the rigidity required of the saw. The open slots 84 and 86 permit pivotal adjustment of the second pair of bars 42 and 44 with respect to the tubes 78 to permit accommodation of saw blades 22 of slightly different lengths. Further, the fact that the tube 78 terminates approximately in the plane of the edges 62 of the second pair of bars 42 and 44 allows the operator to grip both the second pair of bars 42 and 44 and the tube 78, as illustrated in FIG. 1.

After use, the saw may be disassembled and the blade, with attached first and second pairs of bars, stored within the tube 78. The bars of the first and second pair have axial lengths less than one-half of the length of the blade 22, and therefore may be pivoted to a position with their axes of elongation parallel to that of the blade 22, with each of the bars adjacent to the blade 22. Since the bars of each pair will be disposed on opposite sides of the blade 22, the bars tend to protect the teeth 24 of the blade 22, and also tend to protect the user from accidentally cutting himself on the blade teeth. The process of folding the pairs of bars into position is shown in FIG. 17. The pin 92 is then inserted through the aperture 102 of the cap 104, or in the alternative, the pin may be retained within the cap at all times. The loop of twine 90 is then wrapped about the pin 92, or permanently tied to the pin 92, to secure it in position and the other end of the loop of twine is positioned about the pin 32 at the end 30 of the blade 22. The assembly of both pairs of bars and the blade 22 is then inserted into the end 88 of the tube 78, thus drawing the cap 102 toward the end 88. When the assembly of bars and blade is in position, the cap 104 may be placed over the open end 88 of the tube 78. In this manner, the entire saw is stored as a cylindrical tube complete with end caps 82 and 104.

Those skilled in the art will devise other and additional uses for the present invention beyond that set forth herein. It is therefore intended that the scope of the present invention be not limited by the foregoing specification, but rather only by the appended claims.

The invention claimed is:

1. A foldable bucksaw comprising an elongated tube having a cavity extending therein from one end thereof along the axis of elongation of the tube, said tube having a first pair of slots disposed therein at one end thereof, slots of said first pair being disposed on opposite sides of the tube and disposed on an axis traversing the axis of the tube, said first pair of slots being closed and having spaced flat ends, said tube having a second pair of slots disposed therein at the other end of the tube, the slots of said second pair of slots being on opposite side of the tube and disposed on an axis parallel to the axis extending between the slots of the first pair of slots, an elongated blade having parallel spaced sides extending between the ends thereof and straight edges parallel to the axis of elongation of the blade, said parallel edges being spaced from each other by a distance less than the cross sectional dimension of the cavity of the tube, said blade having a plurality of cutting teeth on one of the edges thereof, a first elongated bar pivotally mounted adjacent to one end thereof on one end of the blade, a second elongated bar pivotally mounted adjacent to one end thereof on the other end of the blade, each of said first and second bars having parallel spaced flat sides and spaced edges parallel to the axis of elongation thereof, the edges being spaced by a distance less than the cross sectional dimension of the cavity of the tube, the first bar being slidably disposed and extending through the first pair of slots with the edges thereof in slidable abutment with a flat end of each of the slots of the first pair of slots, and the second bar being slidably disposed and extending through the second pair of slots, the pivotal axes between the blade and first and second bars being normal to the flat sides of the blade and the respective bar, and removable tensioning means mounted on the other end of the first and second bar and urging said other ends of the first and second bars toward each other, whereby the tensioning means may be removed, the bars removed from the slots and pivoted to positions parallel to and adjacent to the blade, and the blade and bars inserted into the cavity of the tube from the one end thereof.

2. A foldable bucksaw comprising the combination of claim 1 wherein the second pair of slots extend from the one end of the tube inwardly.

3. A foldable bucksaw comprising the combination of claim 1 wherein the first bar is one of a pair of substantially identical bars, the other bar of the first pair having a flat side disposed parallel to the flat side of the blade and disposed on the side of the blade opposite the first bar, said other bar being pivotally mounted on the blade on the same axis as the first bar and disposed parallel to the first bar.

4. A foldable bucksaw comprising the combination of claim 3 wherein the second bar is one of a second pair of substantially identical bars, the other bar of the second pair having a flat side disposed parallel to the flat side of the blade and disposed on the side of the blade opposite the second bar, said other bar of the second pair being pivotally mounted on the blade on the same axis as the second bar and disposed parallel to the second bar.

5. A foldable bucksaw comprising the combination of claim 4 wherein each of the bars has an edge with a flat central recess extending therein, the recess having a length parallel to the axis of elongation of the bar greater than the cross sectional dimension of the tube, and the recesses of the bars of the first pair confront the recesses of the bars o the second pair.

6. A foldable bucksaw comprising the combination of claim 1 wherein the tensioning means comprises a loop of flexible material of fixed length, the loop extending between the first and second bars adjacent to the ends of said bars opposite the blade, and a pin mounted on the loop for twisting the loop and having a length greater than one-half the length of the first or second bar.

* * * * *